US010138820B2

(12) United States Patent
Köhler et al.

(10) Patent No.: US 10,138,820 B2
(45) Date of Patent: Nov. 27, 2018

(54) ELECTRONIC THROTTLE CONTROL ASSEMBLY WITH DEFAULT AIRFLOW ADJUSTMENT PIN

(71) Applicant: Continental Automotive Systems, Inc., Auburn Hills, MI (US)

(72) Inventors: Stefan Köhler, Frankfurt (DE); Stefan Burkhard, Kelkheim (DE); John Norman Stockbridge, Waterford, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 127 days.

(21) Appl. No.: 15/333,733

(22) Filed: Oct. 25, 2016

(65) Prior Publication Data

US 2017/0145926 A1 May 25, 2017

Related U.S. Application Data

(60) Provisional application No. 62/259,952, filed on Nov. 25, 2015.

(51) Int. Cl.
*F02D 9/10* (2006.01)
*F02D 11/04* (2006.01)
(Continued)

(52) U.S. Cl.
CPC ............ *F02D 9/1065* (2013.01); *F02D 11/04* (2013.01); *F02D 11/10* (2013.01); *F02D 11/107* (2013.01);
(Continued)

(58) Field of Classification Search
CPC ................... F02D 9/1065; F02D 9/107; F02D 2009/0269; F02D 2009/0296; F02D 11/04;
(Continued)

(56) References Cited

U.S. PATENT DOCUMENTS 3,996,961 A * 12/1976 Siegwart .................. F16K 1/22
137/517
4,947,815 A   8/1990 Peter
(Continued)

FOREIGN PATENT DOCUMENTS

EP   1099840 A2   5/2001
EP   1441117 A1   7/2004
(Continued)

*Primary Examiner* — Erick Solis
*Assistant Examiner* — Anthony L Bacon

(57) ABSTRACT

An excentric pin for an electronic throttle control assembly, which is used to adjust the default position of at least one spring used to control the position of a valve plate, where the valve plate is located in an opening of a housing in the electronic control assembly. The excentric pin is used to adjust the default angle of the valve plate to have an angular tolerance of +/−0.10°. The excentric pin is slideably pressed into an aperture of the housing of the electronic throttle control assembly, and turned using some type of driver. The electronic throttle control assembly may be a one-spring design, or a two-spring design, where the two-spring design requires only one spring pin and the excentric pin. Also, the excenter pin may be used to adjust the position of the sector gear, e.g., function as the lower mechanical stop to provide a minimum opening angle for low leakage, and a minimum opening angle to avoid throttle plate corking into opening of the housing.

24 Claims, 11 Drawing Sheets

(51) Int. Cl.
 *F02D 41/00* (2006.01)
 *F16H 19/00* (2006.01)
 *F02D 11/10* (2006.01)
 *F02D 9/02* (2006.01)

(52) U.S. Cl.
 CPC ....... *F02D 41/0002* (2013.01); *F16H 19/001* (2013.01); *F02D 2009/0269* (2013.01); *F02D 2009/0277* (2013.01); *F16H 2019/008* (2013.01)

(58) Field of Classification Search
 CPC .. F02D 11/10; F16H 19/001; F16H 2019/008; F16K 1/22; F16K 1/221
 See application file for complete search history.

(56) References Cited

U.S. PATENT DOCUMENTS

| | | | |
|---|---|---|---|
| 5,168,852 A * | 12/1992 | Moriguchi | F02D 9/02 123/400 |
| 5,492,097 A | 2/1996 | Byram et al. | |
| 5,775,292 A | 7/1998 | Seeger | |
| 6,032,647 A | 3/2000 | Sato et al. | |
| 6,918,374 B1 | 7/2005 | Kurita et al. | |
| 2004/0226538 A1* | 11/2004 | Cannone | F02D 9/02 123/396 |
| 2005/0092956 A1* | 5/2005 | Fauni | F02D 9/1065 251/305 |
| 2006/0042589 A1* | 3/2006 | Hanasato | F02D 9/02 123/336 |
| 2007/0056599 A1 | 3/2007 | Kondo | |
| 2007/0144486 A1* | 6/2007 | Tanimura | F02D 9/1065 123/399 |
| 2010/0212626 A1* | 8/2010 | Vogler | F02D 9/10 123/337 |
| 2015/0337743 A1* | 11/2015 | Cowan | F02D 9/08 261/64.2 |

FOREIGN PATENT DOCUMENTS

| | | |
|---|---|---|
| EP | 1515022 A1 | 3/2005 |
| JP | H11173169 | 6/1999 |
| JP | 2006022678 | 1/2006 |
| JP | 2007077846 | 3/2007 |

\* cited by examiner

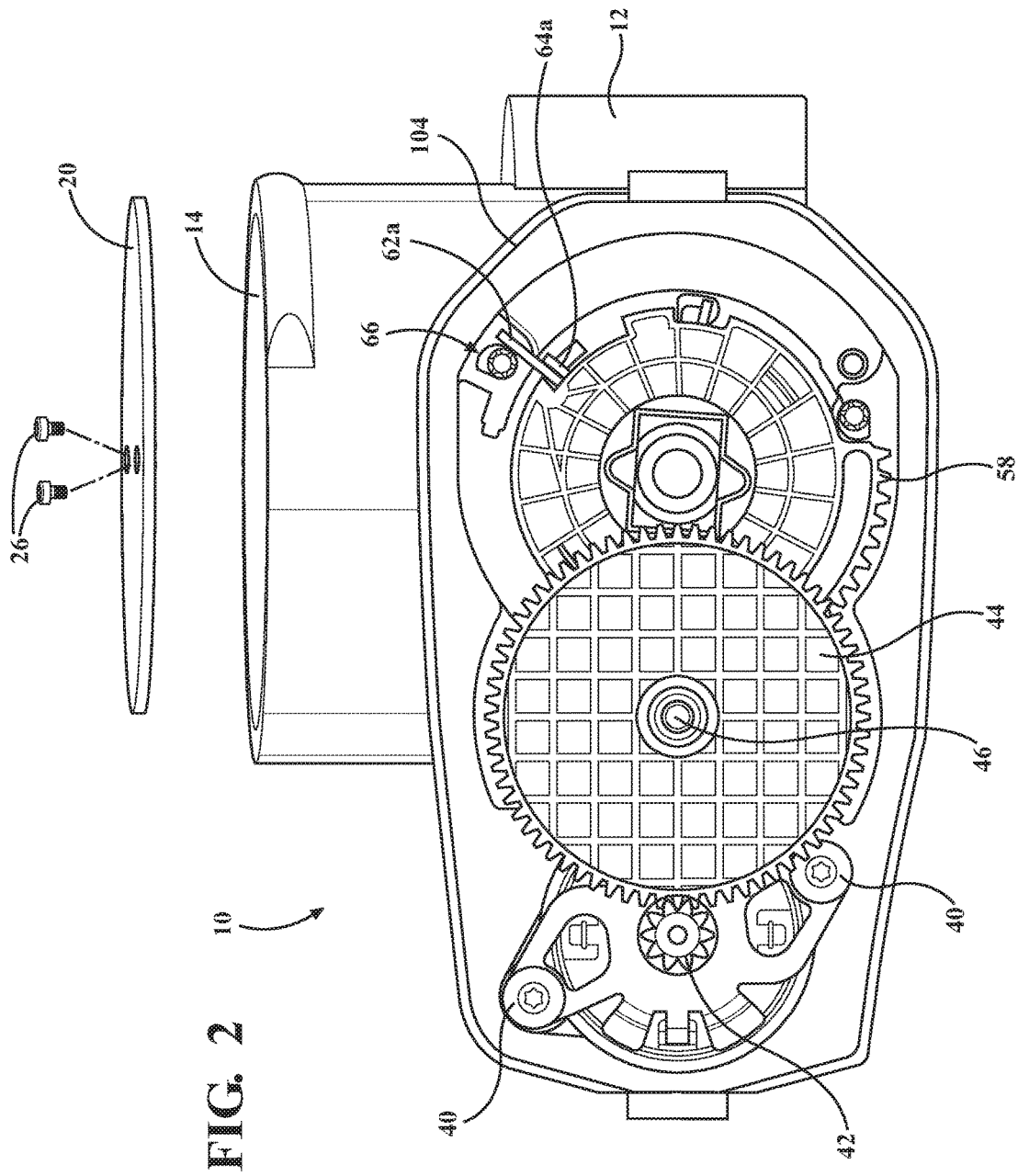

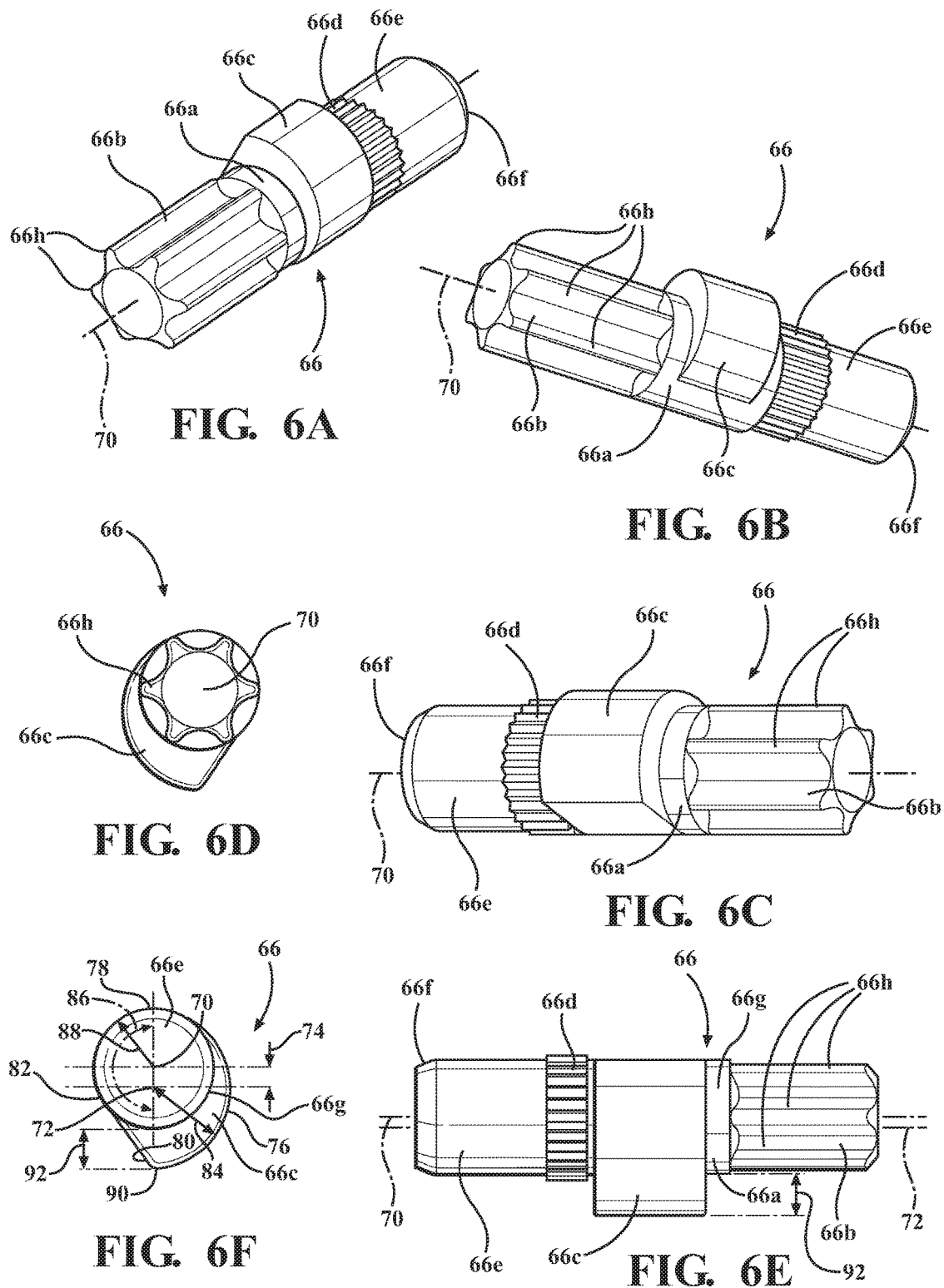

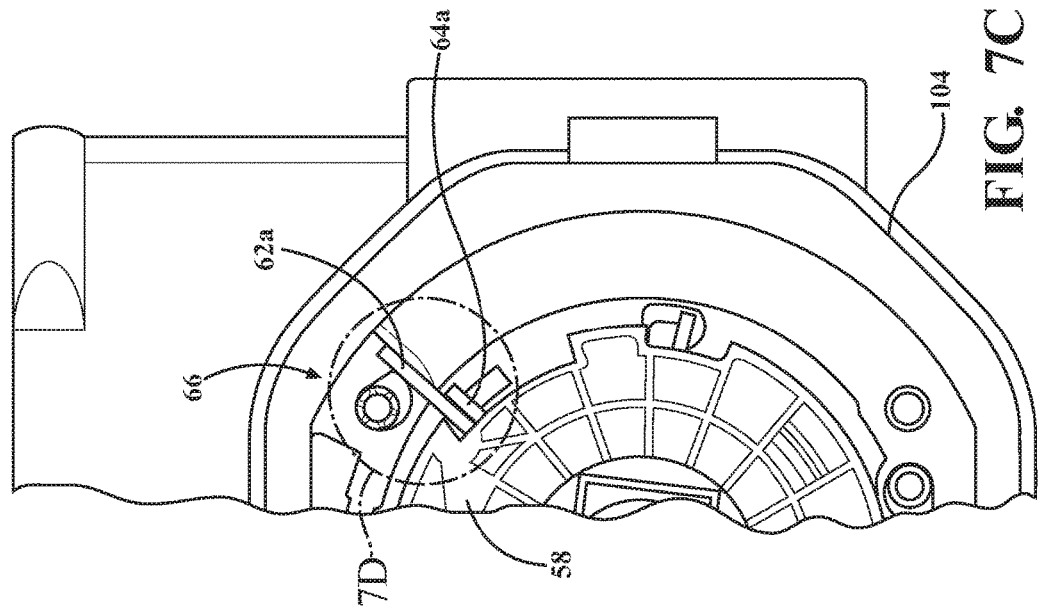
FIG. 7C
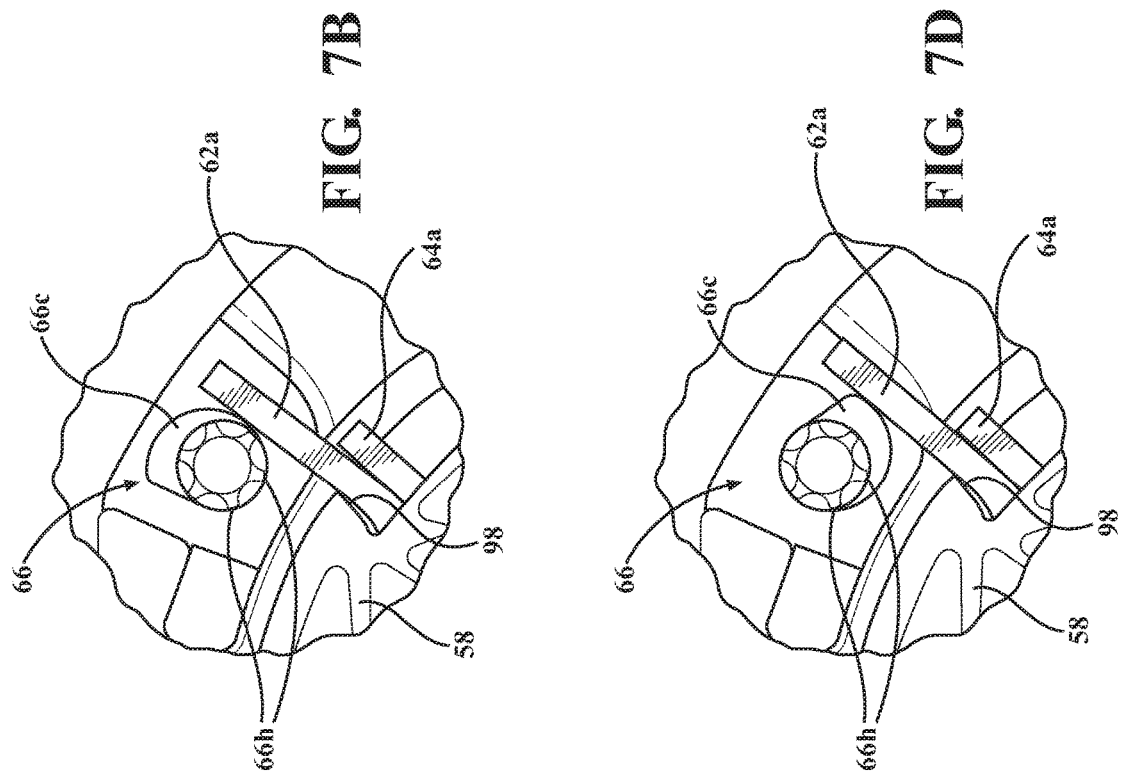
FIG. 7B
FIG. 7D

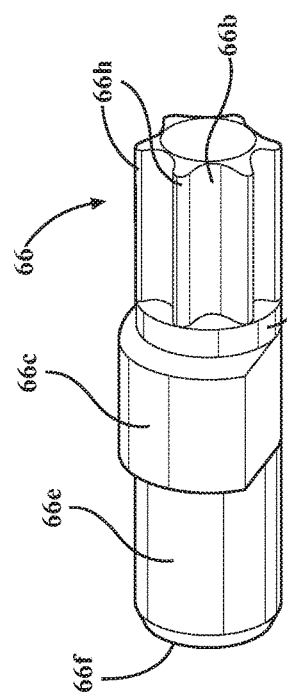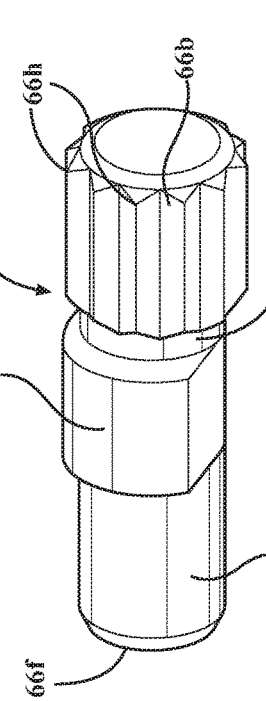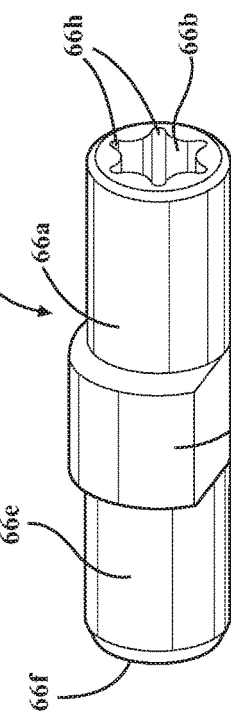
FIG. 11A  FIG. 11B  FIG. 11C
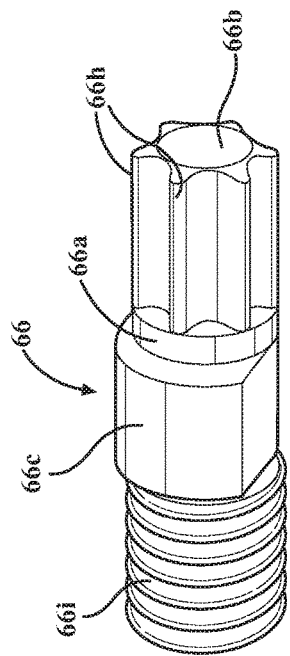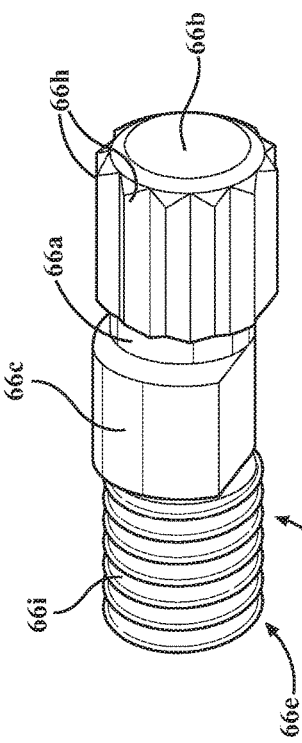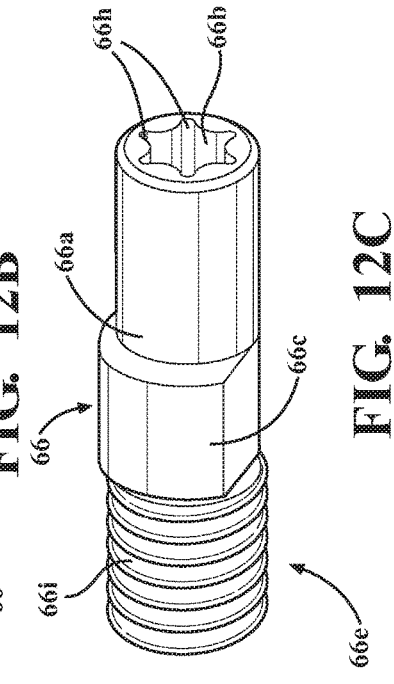
FIG. 12A  FIG. 12B  FIG. 12C

US 10,138,820 B2

ELECTRONIC THROTTLE CONTROL ASSEMBLY WITH DEFAULT AIRFLOW ADJUSTMENT PIN

CROSS-REFERENCE TO RELATED APPLICATIONS

This application claims the benefit of U.S. Provisional Application No. 62/259,952 filed Nov. 25, 2015. The disclosure of the above application is incorporated herein by reference.

FIELD OF THE INVENTION

The invention relates generally to an excentric pin used for adjusting the position of at least one spring in an electronic throttle control assembly to adjust the default flow position of a throttle plate.

BACKGROUND OF THE INVENTION

Electronic throttle bodies are generally known, and are used for controlling the flow of air into an engine. These throttle bodies have some type of valve, which is typically a valve plate disposed in a port of a housing, which is rotated to increase or decrease the amount of air flow into the engine. Electronic throttle bodies typically have a "default air flow" setting, which is achieved by setting a specific opening angle of the throttle plate relative to its fully closed position. A final gear (such as a sector gear), is mounted on a shaft along with the throttle plate, and the sector gear is used to rotate the shaft and throttle plate.

The default air flow is achieved by including the use of an opening spring connected to the sector gear, where the opening spring is supported by a spring stop inside the sector gear and a default stop located in the housing. Many design requirements include specifying the tolerance of the opening angle of the valve plate to be ±0.1°, and in some instances, less than ±0.1°.

During assembly, the sector gear is mounted to the shaft, the throttle plate is in a fully closed position, and the sector gear is positioned such that the opening spring places the gear against a gear stop. Positioning the valve plate to have the desired default air flow setting requires a significant amount of effort.

One of the solutions to provide proper adjustment of the valve plate is to use set screws, either to set the default stop position of the valve plate or the gear stop position. However, using set screws has the disadvantage that the screw diameter must be larger than the end of the spring, and large enough to guaranty the proper connection to the appropriate component attached to the throttle body. This results in the diameter of these set screws being too large to position them properly inside the gearbox. Therefore, the screws must be driven for rotation from outside of the gearbox. After assembly, the set screws must be secured and the access holes for the set screws must be closed off to ensure the set screws remain properly positioned and cannot be manipulated.

Accordingly, there exists a need for a throttle body which incorporates the ability to adjust the default air flow setting of the valve plate, without the drawbacks mentioned above.

SUMMARY OF THE INVENTION

The present invention is an excentric pin for an electronic throttle control assembly, where the pin is used to adjust the position of at least one spring, to therefore adjust the default flow position of a valve plate, where the valve plate is located in an opening of a housing in the electronic control assembly. The excentric pin is used to adjust the default air flow by adjusting the default angle of the valve plate with an angular tolerance of +/−0.10°, which essentially reduces the tolerance during assembly by a factor of 3.5 due to the ability to adjust the cam position of the excentric pin, and the position of the end of the spring resting against the cam.

The excentric pin is slideably pressed into an aperture of the housing of the electronic throttle control assembly. The excentric pin is turned using some type of driver. In one embodiment, the driver has multiple external splines, where the excentric pin is located in an aperture of the housing, and secured against rotation after adjustment to the desired position.

In one embodiment, the electronic throttle control assembly is a one-spring design, and in another embodiment, the electronic control assembly is a two-spring design, where the two-spring design requires only one excentric pin. The two-spring design uses the excentric pin to adjust the end of each of the springs, and thus angle of the valve plate and airflow associated with the limp-home mode. With the one-spring design, the excentric pin is used to reduce or eliminate the endplay of each end of spring, and/or to set the angle and air flow.

In one embodiment, the excentric pin has an external drive portion used to adjust the position of the pin. In another embodiment, the excentric pin includes an excenter, and in yet another embodiment, the excentric pin includes press-zone, which may have a ribbed, threaded, or knurled surface.

Also, the excenter pin may be used to adjust the position of the sector gear, e.g., function as the lower mechanical stop to provide a minimum opening angle for low leakage, and a minimum opening angle to avoid throttle plate corking in the air channel.

In one embodiment, the present invention is a throttle control assembly, which includes a housing, a central port formed as part of the housing, a valve plate mounted on a shaft such that the valve plate is disposed in the central port, a gear assembly which includes a sector gear mounted on a shaft, and an actuator that is engaged with the gear assembly. A mounting aperture is integrally formed as part of the housing, and at least one adjustment pin is disposed in the mounting aperture. The throttle control assembly also includes an opening spring having a first end in contact with the at least one adjustment pin, and a second end engaged with the sector gear, and a closing spring having a first end adjacent the first end of the opening spring, and a second end engaged with the housing. The adjustment pin includes a main body, and a cam integrally formed with the main body such that the cam is in contact with the first end of the opening spring. A drive portion is integrally formed with the main body adjacent the cam, and the drive portion of the adjustment pin is rotated such that the cam changes the position of the opening spring and the closing spring, to adjust the position of the sector gear and the valve plate.

The adjustment pin also includes a knurled portion formed as part of the main body adjacent the cam, and a press-zone portion integrally formed as part of the main body adjacent the knurled portion. During assembly, the press-zone portion is pressed into the mounting aperture, and after the adjustment pin is rotated to change the position of the first end of the opening spring and the first end of the closing spring, the adjustment pin is further pressed into the mounting aperture such that the knurled portion is pressed into the mounting aperture, fixedly mounting the adjustment pin in the mounting aperture.

In an alternate embodiment, a ribbed portion is formed as part of the main body adjacent the cam instead of the knurled portion, and the ribbed portion is inserted into the mounting aperture formed as part of the housing to fixedly mount the adjustment pin to the housing.

The drive portion may be an external drive portion having a plurality of external splines, or an internal drive portion having a plurality of internal splines.

In another alternate embodiment, instead of the cam, different size bushing may be chosen and mounted to the pin, where the diameter of the bushing chosen corresponds to the desired location of the spring.

In another alternate embodiment, a second adjustment pin is fixedly mounted to the housing adjacent the sector gear and in contact with a gear stop integrally formed as part of the sector gear. The second adjustment pin is positioned to adjust the position of the gear and the default flow position of the valve plate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a perspective view of a throttle control assembly, with the cover removed, according to embodiments of the present invention;

FIG. 6A is a first perspective view of first embodiment of an excenter pin used as part of a throttle control assembly, according to embodiments of the present invention;

FIG. 6B is a second perspective view of first embodiment of an excenter pin used as part of a throttle control assembly, according to embodiments of the present invention;

FIG. 6C is a third perspective view of first embodiment of an excenter pin used as part of a throttle control assembly, according to embodiments of the present invention;

FIG. 6D is a front view of a first embodiment of an excenter pin used as part of a throttle control assembly, according to embodiments of the present invention;

FIG. 6E is a side view of a first embodiment of an excenter pin used as part of a throttle control assembly, according to embodiments of the present invention;

FIG. 6F is a rear view of a first embodiment of an excenter pin used as part of a throttle control assembly, according to embodiments of the present invention;

FIG. 7B is an enlarged view of a circled portion shown in FIG. 7A;

FIG. 7C is a side view of part of a throttle control assembly, with the cover removed and the excenter pin in a second position, according to embodiments of the present invention;

FIG. 7D is an enlarged view of a circled portion shown in FIG. 7C;

FIG. 11A is a variation of the embodiment of the excenter pin shown in FIGS. 6A-6F, with the knurled portion removed, according to embodiments of the present invention;

FIG. 11B is a variation of the embodiment of the excenter pin shown in FIGS. 9A-9B, with the knurled portion removed, according to embodiments of the present invention;

FIG. 11C is a variation of the embodiment of the excenter pin shown in FIGS. 10A-10B, with the knurled portion removed, according to embodiments of the present invention;

FIG. 12A is a variation of the embodiment of the excenter pin shown in FIGS. 6A-6F, which includes a ribbed portion instead of the knurled portion, according to embodiments of the present invention;

FIG. 12B is a variation of the embodiment of the excenter pin shown in FIGS. 9A-9B, which includes a ribbed portion instead of the knurled portion, according to embodiments of the present invention;

FIG. 12C is a variation of the embodiment of the excenter pin shown in FIGS. 10A-10B, which includes a ribbed portion instead of the knurled portion, according to embodiments of the present invention;

DETAILED DESCRIPTION OF THE PREFERRED EMBODIMENTS

Figure 1:
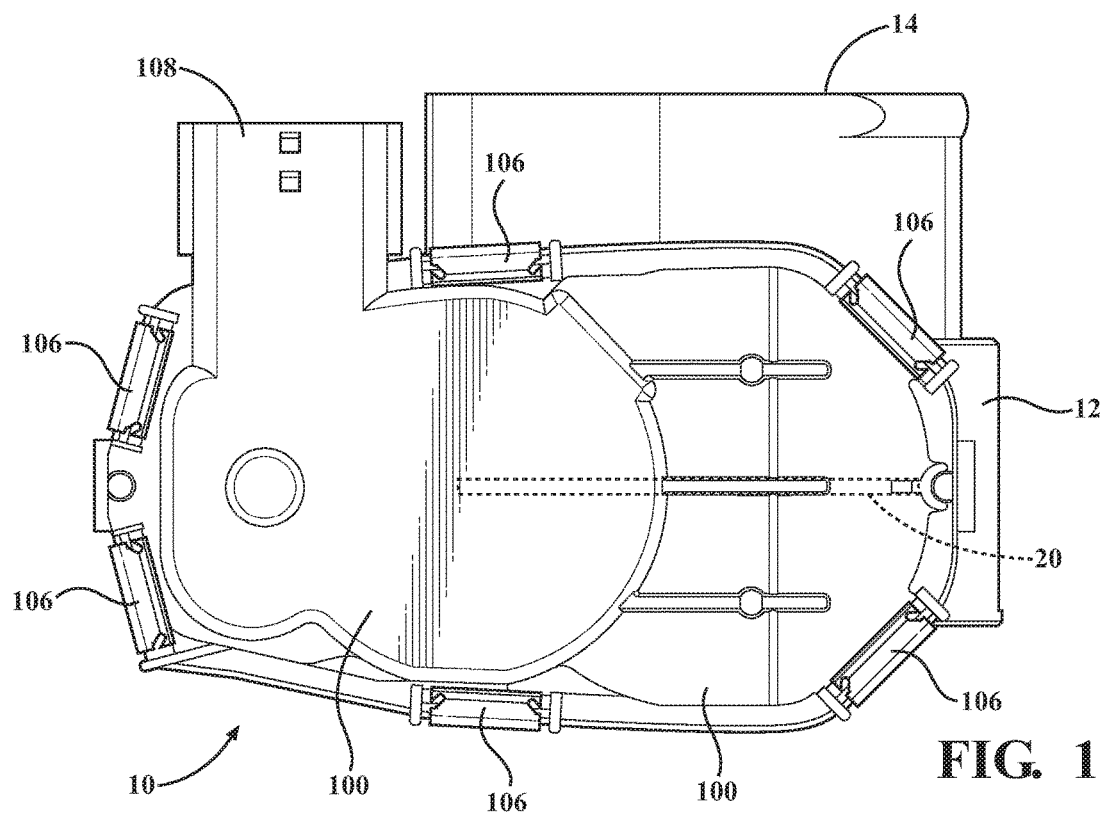
FIG. 1 is a perspective view of a throttle control assembly, according to embodiments of the present invention.

The following description of the preferred embodiment(s) is merely exemplary in nature and is in no way intended to limit the invention, its application, or uses.

A throttle control assembly according to the present invention is shown in the Figures generally at 10. The assembly 10 includes a housing 12, and formed as part of the housing 12 is a central port 14, through which air passes during operation of the assembly 10. Disposed in the central port 14 is a shaft 16, which is rotatable. The shaft 16 includes a slot 18, and disposed in the slot 18 is a valve member, which in this embodiment is a valve plate 20. The valve plate 20 includes two apertures, which are in alignment with two threaded apertures formed as part of the shaft 16. Connecting the plate 20 to the shaft 16 is a fastener, which in this embodiment is a threaded screw 26, which is inserted through the apertures of the plate 20 and the threaded apertures of the shaft 16, securing the valve plate 20 to the shaft 16.

The shaft 16 is partially disposed in an aperture 28 formed as part of the housing 12. Also located in the aperture 28 is a first bearing assembly (not shown), and a second bearing assembly 30, which support the shaft 16, and allow for the shaft 16 to rotate relative to the housing 12. The first bearing assembly is sealed in the aperture 28 by a plug, and the second bearing assembly 30 is also sealed in the aperture 28 by a C-washer 34, located in a groove 50 formed as part of the shaft 16. The second bearing assembly 30 is located between the C-washer 34 and the end of the shaft 16, and is located inside and supported by a boss 52 formed as part of the housing 12.

The housing 12 also includes a cavity, and disposed in the cavity is an actuator, which in this embodiment is an electric motor 38, held in place by two motor screws 40. Attached to the shaft of the motor 38 is a first gear, or pinion gear 42. The pinion gear 42 is in mesh with a second gear, or intermediate gear 44. The intermediate gear 44 is mounted on an intermediate shaft 46, and the intermediate shaft 46 partially extends into an aperture 48 formed as part of the housing 12. Also formed as part of the intermediate gear 44 is a middle gear (not shown), which is smaller in diameter compared to the intermediate gear 44. The middle gear is in mesh with a sector gear 58, and the sector gear 58 is mounted on the shaft 16, either through a press fit connection, or some other type of connection.

The assembly 10 also includes an opening spring 62 and a closing spring 64. The opening spring 62 has a first end 62a and a second end 62b, and the first end 62a is in contact with a first pin, shown generally at 66. When assembled, the opening spring 62 circumscribes part of the closing spring 64, and the closing spring 64 also includes a first end 64a and a second end 64b. The first end 64a of the closing spring 64 is adjacent the first end 62a of the opening spring 62, as shown in FIGS. 2, 4, and 7A-7D, and therefore both the opening spring 62 and closing spring 64 may be adjusted by the first pin 66.

Figure 7A:
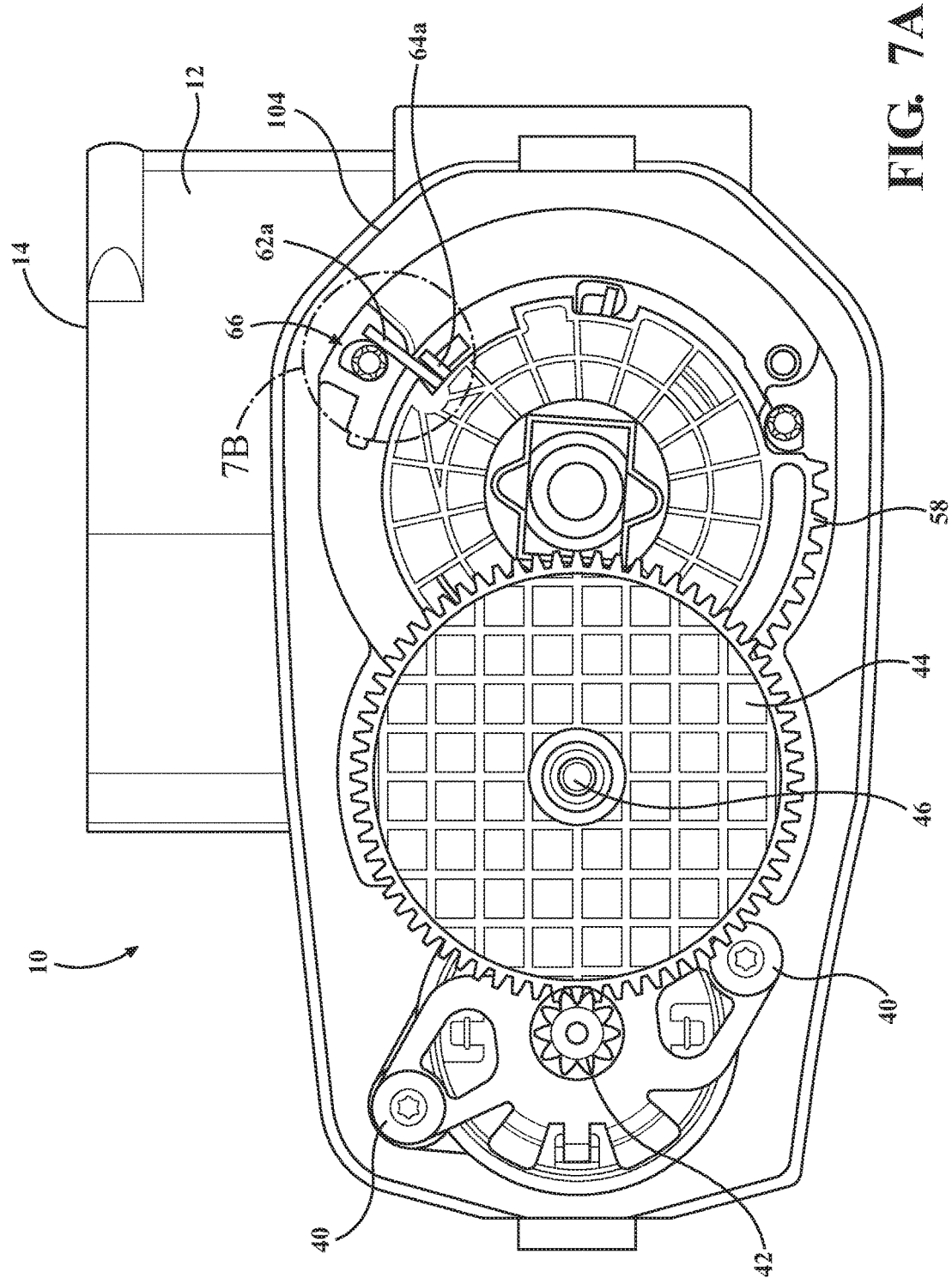
FIG. 7A is a side view of a throttle control assembly, with the cover removed and the excenter pin in a first position, according to embodiments of the present invention.

In this embodiment, the first pin 66 is an excenter pin 66, which is disposed in a mounting aperture 68 formed as part of the housing 12. The excenter pin 66 includes a main body 66a, which is cylindrically shaped, and integrally formed with the main body 66a is a drive portion 66b, a cam 66c, a knurled portion 66d, a press-zone portion 66e, and a reduced diameter portion 66f. The cam 66c is centrally located on the main body 66a, the drive portion 66b is located on one side of the cam 66c, and the knurled portion 66d is located on the other side of the cam 66c. The press-zone portion 66e is adjacent the knurled portion 66d. The aperture 68 is shaped such that the pin 66 is able to be pressed into the aperture 68, and have a press-fit connection. During assembly, the pin 66 is inserted into the aperture 68, and the reduced diameter portion 66e facilitates the insertion of the pin 66 into the aperture 68. The pin 66 is inserted into the aperture 68, but only such that the press-zone portion 66e is located in the aperture 68, and the rest of the pin 66, including the knurled portion 66d is not located in the aperture 68. The pin 66 is positioned such that the cam 66c is in contact with the first end 62a of the opening spring 62, as shown in FIGS. 7A-7B. The drive portion 66b is then used to rotate the pin 66 such that position of the cam 66c is changed relative to the first end 62a of the opening spring 62. The cam 66c is shaped to change the position of the first end 62a of the opening spring 62 and the first end 64a of the closing spring 64 as the pin 66 is rotated, which therefore changes the position of the sector gear 58, the shaft 16, and therefore the valve plate 20, as shown in FIGS. 7C-7D. This adjustment of the valve plate 20 changes the "default flow position" of the valve plate 20. The valve plate 20 is placed in the default flow position as a result of the biasing force applied from the springs 62,64 when the motor 38 is deactivated, and not being used to control the movement of the valve plate 20. This adjustment of the valve plate 20 allows for adjustment of the default flow of air through the central port 14 when the motor 38 is deactivated.

The shape of the cam 66c allows for the default flow position of the valve plate 20 to be adjusted in very small increments, such as, but not limited to, increments of ±0.10 degrees, which essentially reduces the tolerance during assembly by a factor of 3.5 due to the ability to adjust the position of the excentric pin 66. Once the pin 66 is rotated to the desired position, the pin 66 is then further pressed into the aperture 68 such that the knurled portion 66d is pressed into the aperture 68. As the knurled portion 66d is pressed into the aperture 68, the aperture 68 partially deforms around the knurled portion 66d. The deformation of the area of the aperture 68 around the knurled portion 66d locks the pin 66 in the desired portion, and prevents the pin 66 from rotating to an undesired position.

The cam 66c is shaped to change the position of the ends 62a,64a of each spring 62,64 as the pin 66 is rotated. The shape of the cam 66c may be varied to alter how the rotation of the pin 66 changes the position of the ends 62a,64a of each spring 62,64. Referring to FIGS. 6A-6F, the pin 66 has a first axis 70, which extends through the center of the pin 66. The cam 66c in this embodiment has a shape that corresponds to a section of a cylinder having a larger diameter than the diameter of the main body 66a. The pin 66 also has a second axis 72, which represents the axis 72 of the cam 66c, and the second axis 72 is offset from the first axis 70. In this embodiment, the second axis 72 is offset from the first axis 70 by a distance 74 of 0.65 millimeters; however, it is within the scope of the invention that other distances may be used. The cam 66c also has an arcuate portion 76, which begins at a first tangential point 78, and the arcuate portion 76 extends at an angle 86 of 180° as shown in FIG. 6F. The arcuate portion 76 ends at an end surface 80. The end surface 80 is substantially flat, and is tangential to the main body 66a, and the end surface 80 ends at a second tangential point 82. The radius 84 of the cam 66c in this embodiment is 2.48 millimeters, but it is within the scope of the invention that the radius 84 may vary, and may be changed to suit a particular application.

As mentioned above, the cam 66c has a shape that corresponds to a section of a cylinder. The cam 66c extends around the main body 66a at the angle 86 of 180 degrees. The radius 84 of the cam 66c, and the angle 86 about which the cam 66c extends may also be varied to suit a particular application. The width 76a of the cam 66c may also be varied to suit different applications, where the springs 62,64 are different sizes, or the size of the other components is varied as well.

In this embodiment, the main body 66a has a radius 88 of 1.83 millimeters. The end 90 of the cam 66c is adjacent the end surface 80. The difference between the radius 88 of the main body 66a and the radius 84 of the cam 66c, combined with the second axis 72 being offset from the first axis 70 by the distance 74 of 0.65 millimeters, produces a max distance 92 between the outer surface 66g of the main body 66a and the end 90 of the cam 66c. The max distance 92 is the furthest the outer surface of the cam 66c is from the outer surface 66g of the main body 66a. The max distance 92 in this embodiment is 1.3 millimeters, but it is with the scope of the invention that the cam 66c and main body 66a may be of different sizes and oriented differently relative to one another, such that the max distance 92 may be varied.

The second end 62b of the opening spring 62 is engaged with a tab portion 94 formed as part of the sector gear 58. The second end 64b of the closing spring 64 is positioned adjacent a spring stop 96 formed as part of the housing 12. In addition to the pin 66, the first end 62a of the opening spring 62 is also positioned against a spring stop 98 formed as part of the sector gear 58.

Connected to the housing 12 is a cover 100, and disposed between the cover 100 and the housing 12 is a seal (not shown) which surrounds an outer lip 104 formed as part of the housing 12. The cover 100 is connected to the housing 12 using a plurality of clips 106. The cover 100 also includes a connector 108 which is in electrical communication with the motor 38, such that the connector 108 is able to be connected to a source of power to provide power to the motor 38. Integrally formed with the cover 100 is a lead frame, which places the connector 108 in electrical communication with a position sensor, used to detect the angle of rotation of the sector gear 58.

In operation, the closing spring 64 biases the sector gear 58, and therefore the shaft 16 and throttle plate 20 such that the throttle plate 20 is in a closed position, such that the central bore 14 is substantially closed, or blocked completely, depending upon how the assembly 10 is configured. When current is applied to the motor 38, the pinion gear 42 is rotated, which causes the rotation of the intermediate gear 44, the second or middle gear of the intermediate gear 44, and the sector gear 58. To rotate the sector gear 58, the bias applied to the sector gear 58 by the closing spring 64 is overcome. The amount of rotation of the sector gear 58 is in proportion to the amount of current applied to the motor 38 combined with the force applied to the sector gear 58 from the opening spring 62, which must overcome the force applied to the sector gear 58 by the closing spring 64. Since the sector gear 58 is coupled to the shaft 16, rotation of the sector gear 58 rotates the shaft 16 to rotate the valve plate 20. As noted above, the position sensor detects the position of the sector gear 58 and thus the plate 20 during the operation of the throttle body assembly 10.

As the sector gear 58 is rotated, the shaft 16 is rotated as well, rotating the plate 20, and allowing increased levels of air flow through the central bore 14. The amount of rotation of the sector gear 58 is detected by the sensor, such that the valve plate 20 may be placed in a desired position.

Due to variations in tolerances in the assembly 10, and differences in flow requirements for different applications, the default position of the valve plate 20 may need to be adjusted during assembly. The pin 66 may be rotated during assembly as described above to adjust the position of the springs 62,64, to therefore change the default flow position of the valve plate 20. The pin 66 may be rotated such that the cam 66c is not in contact with the first end 62a of the opening spring 62, but rather the first end 62a of the opening spring 62 is in contact with the main body 66a. The pin 66 may also be rotated such that the first end 62a is in contact anywhere along the arcuate portion 76 of the cam 66c in between the first tangential point 78 and the end 90 of the cam 66c to properly configure the springs 62,64, placing the valve plate 20 in the desired position.

As mentioned above, the adjustment of the pin 66 is accomplished by rotating the drive portion 66b. In the embodiment shown in FIGS. 2 and 5-7D, the drive portion 66b is an external drive portion 66b, with several splines 66h. In this embodiment, there are six splines 66h, but it is within the scope of the invention that different amounts of splines 66h may be used.

Figure 3:
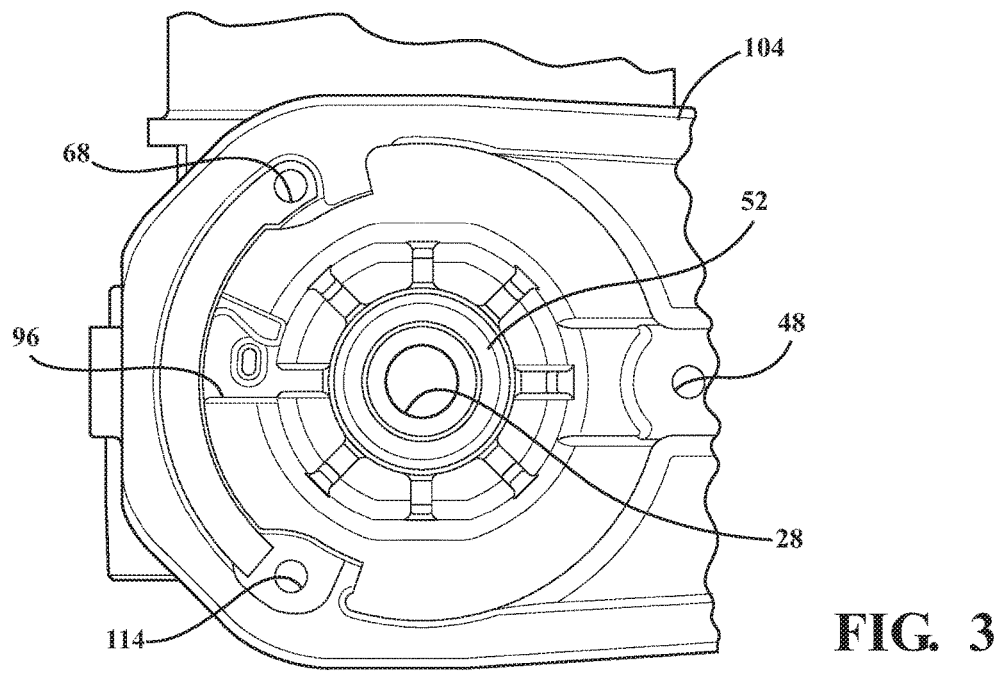
FIG. 3 side view of a portion of a housing, used as part of a throttle control assembly, according to embodiments of the present invention.
Figure 4:
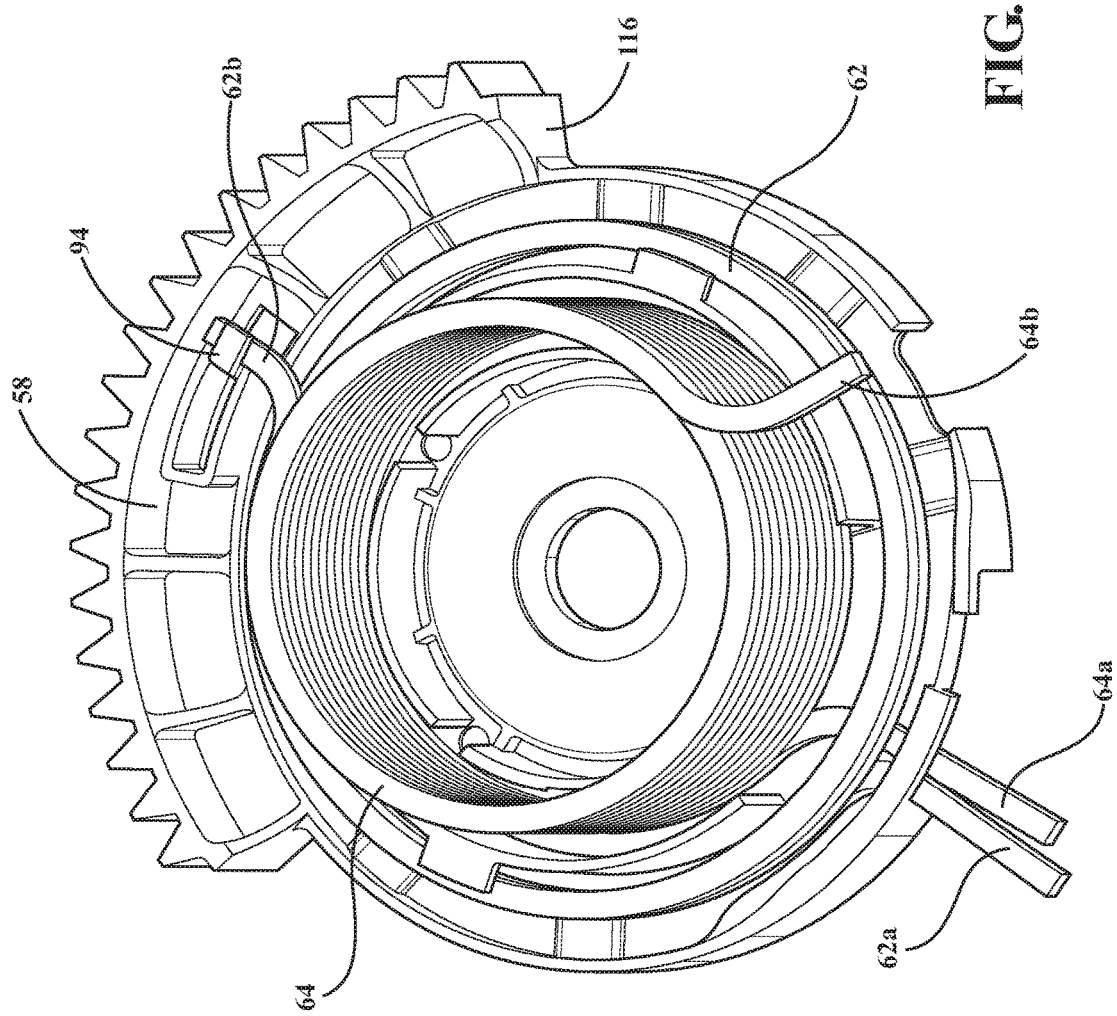
FIG. 4 is a perspective view of a sector gear with an opening spring and a closing spring attached to the sector gear, used as part of a throttle control assembly, according to embodiments of the present invention.
Figure 5:
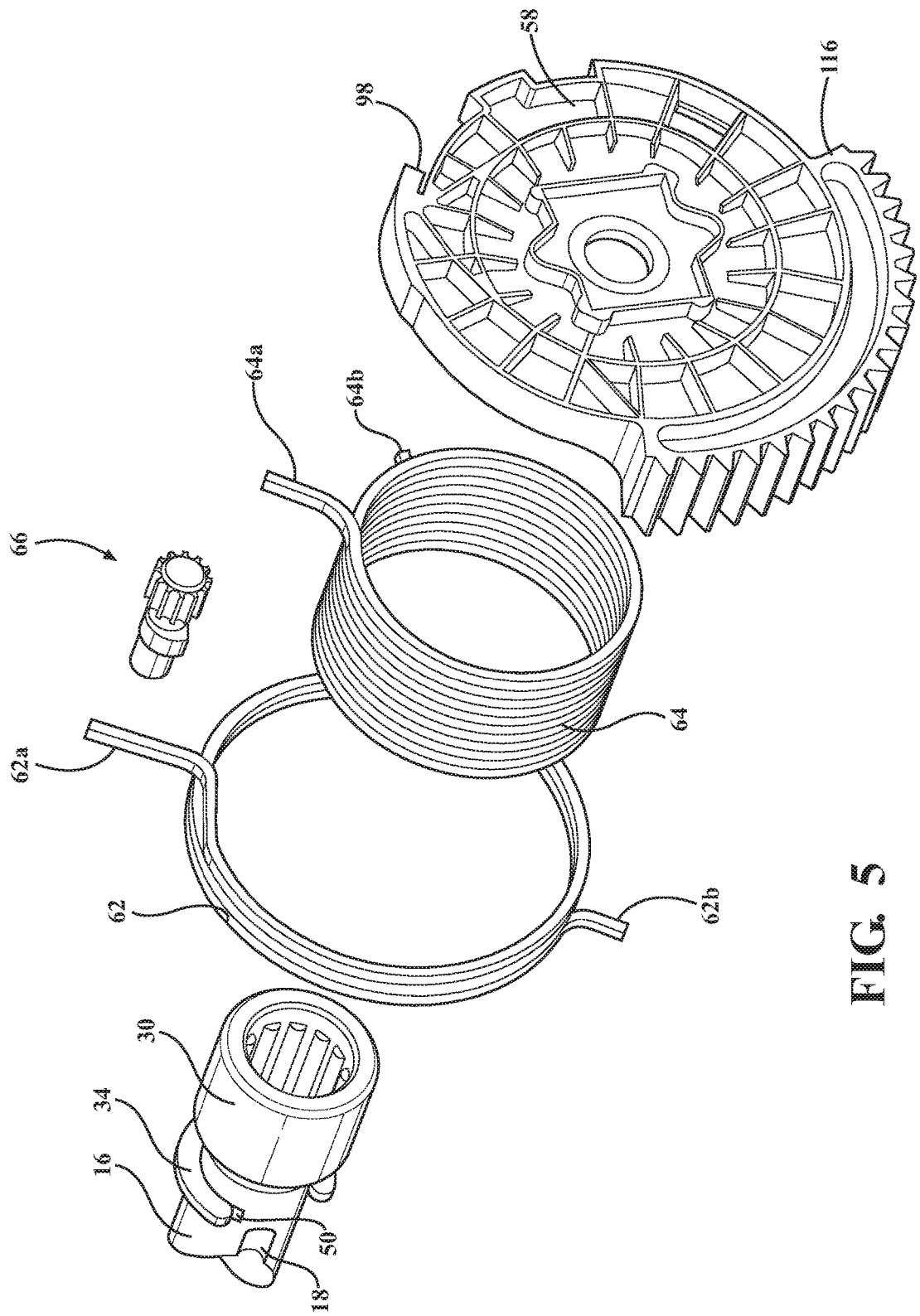
FIG. 5 is an exploded view of several components which are part a throttle control assembly, according to embodiments of the present invention.
Figure 8A:
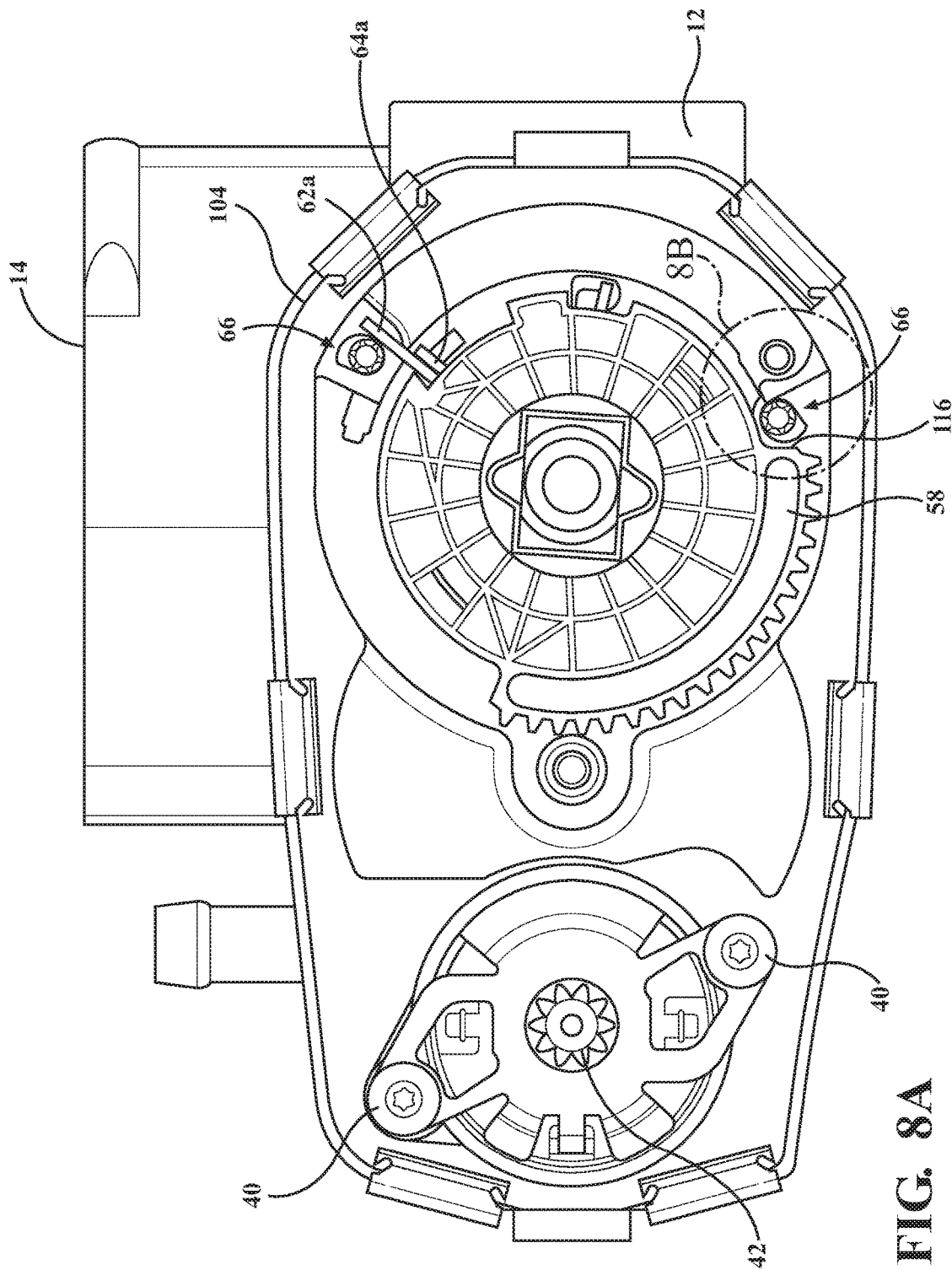
FIG. 8A is a side view of another embodiment of a throttle control assembly having an additional excenter pin, with the cover removed, according to embodiments of the present invention.
Figure 8B:
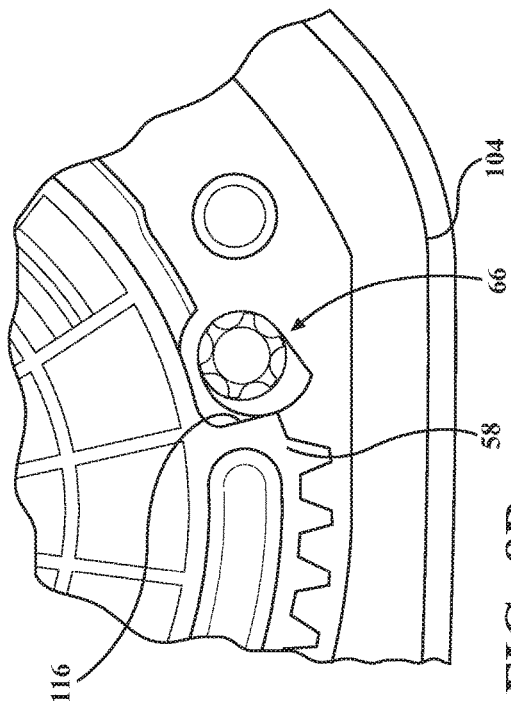
FIG. 8B is an enlarged view of a circled portion shown in FIG. 8A.

Another embodiment of the assembly 10 is shown in FIGS. 8A-8B, with like numbers referring to like elements. In this embodiment, there is an additional aperture 114 formed as part of the housing 12 shown in FIG. 3, and another pin 66 may be inserted, such that the pin 66 is in contact with a gear stop 116 formed as part of the sector gear 58. The pin 66 located in the aperture 114 may be rotated to adjust the default position of the sector gear 58. Having a pin 66 in the aperture 68 to adjust the position of the springs 62,64 and a pin 66 in the aperture 114 to adjust the position of the sector gear 58 increases the precision of how the valve plate 20 may be adjusted.

Figure 9A:
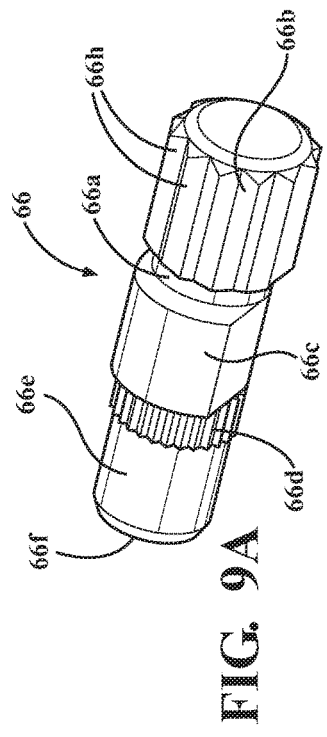
FIG. 9A is a first perspective view of a second embodiment of an excenter pin used as part of a throttle control assembly, according to embodiments of the present invention.
Figure 9B:
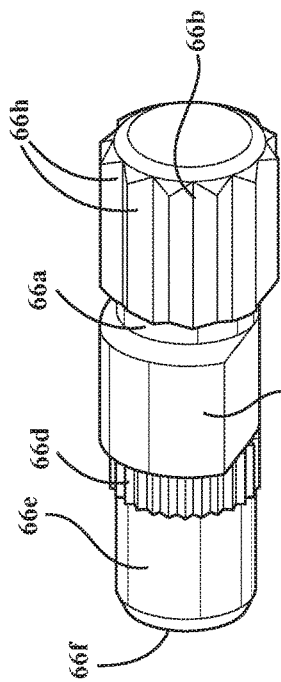
FIG. 9B is a second perspective view of a second embodiment of an excenter pin used as part of a throttle control assembly, according to embodiments of the present invention.

There are several possible alternate embodiments of the pin 66. One of these embodiments of the pin 66 is shown in FIGS. 9A-9B, with like numbers referring to like elements. The embodiment shown in FIGS. 9A-9B has an external drive portion 66b, with an increased number of splines 66h. There are twelve splines 66h in the embodiment of the pin 66 shown in FIG. 9A-9B, and the embodiment with twelve splines 66h may or may not have the knurled portion 66d.

Figure 10A:
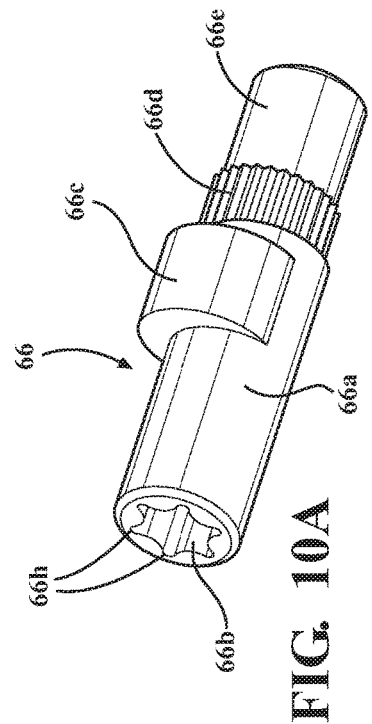
FIG. 10A is a first perspective view of a third embodiment of an excenter pin used as part of a throttle control assembly, according to embodiments of the present invention.
Figure 10B:
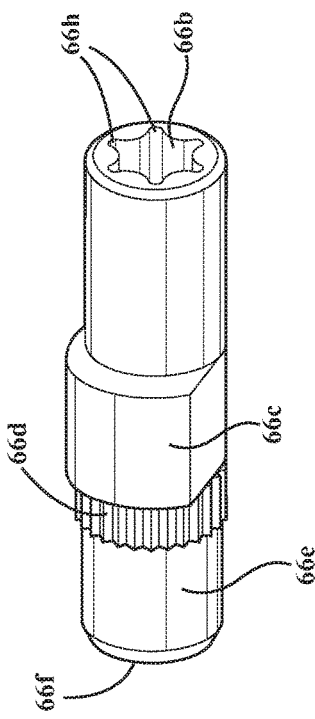
FIG. 10B is a second perspective view of a third embodiment of an excenter pin used as part of a throttle control assembly, according to embodiments of the present invention.

Another alternate embodiment of the pin 66 is shown in FIG. 10A-10B, with like numbers referring to like elements. In this embodiment, the drive portion 66b is an internal drive portion 66b, with six internal splines 66h. More or less internal splines 66h may be used in other embodiments as desired.

The pin 66 in FIGS. 2 and 5-7D is shown with the knurled portion 66d. However, it is also possible to manufacture the pin 66 without the knurled portion 66d, shown in FIGS. 11A-11C, if the press-fit into the aperture 68 is sufficient.

In all of the embodiments of the pin 66 described above, the knurled portion 66d may be replaced with a ribbed portion 66i, shown in FIGS. 12A-12C. The ribbed portion 66i may extend along a portion or all of the press-zone portion 66e. The ribbed portion 66i is used to provide a more robust press-fit connection as the pin 66 is inserted into the corresponding apertures 68,114.

Figure 13A:
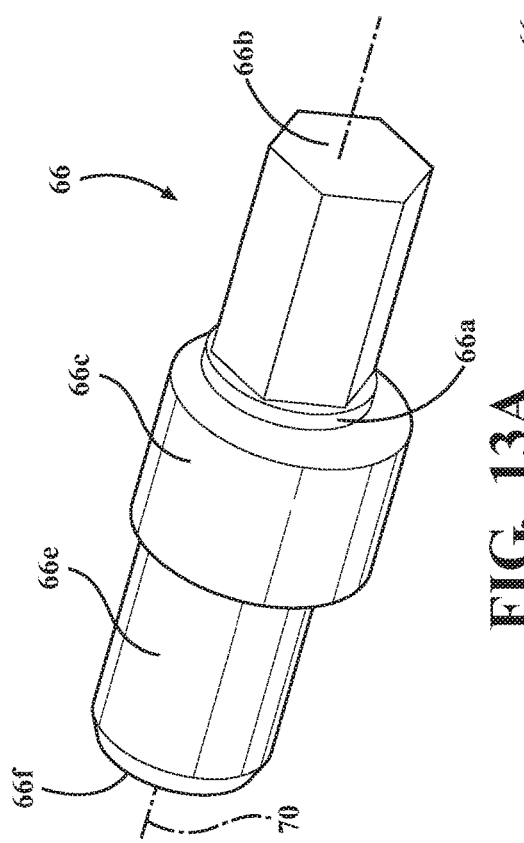
FIG. 13A is a perspective view of another embodiment of an excenter pin, having a full cam, according to embodiments of the present invention.
Figure 13B:
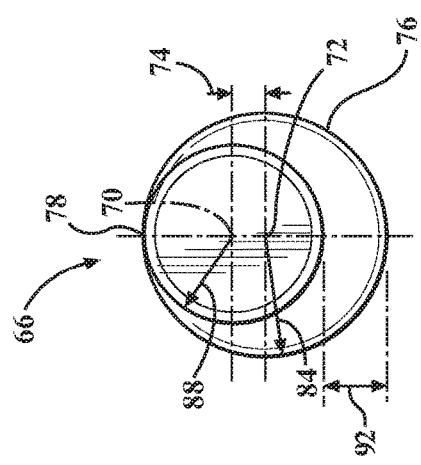
FIG. 13B is a rear view of another embodiment of an excenter pin, having a full cam, according to embodiments of the present invention.

Yet another embodiment of the pin 66 is shown in FIGS. 13A-13B. In this embodiment, the cam 66c offset from the main body 66a, in a similar manner to the cam 66c described in the previous embodiments. However, the cam 66c in this embodiment is a full cylindrical portion, as opposed to having the shape the corresponds to a section of a cylinder. The arcuate portion 76 of the cam 66*c* extends a full 360° about the axis 72. In this embodiment, the drive portion 66*b* is a hexagonal drive portion 66*b*. The embodiment shown in FIGS. 13A-13B is shown without a knurled portion 66*d* or a ribbed portion 66*i*, but it is within the scope of the invention that these features may be incorporated into the embodiment shown in FIGS. 13A-13B.

In other embodiments, the cover 80 may include apertures (not shown) which deform around the drive portion 66*b* of the pin 66 as the cover 80 is connected to the housing 12.

Figure 14:
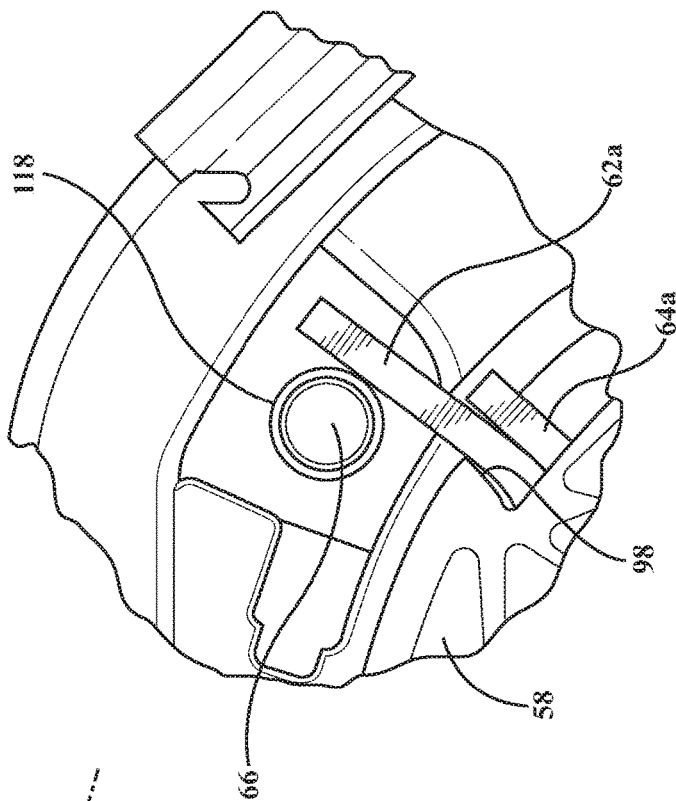
FIG. 14 is an enlarged side view of a throttle control assembly, with the cover removed and another alternate embodiment of an excenter pin incorporating a bushing, according to embodiments of the present invention.

Another embodiment of the invention is shown in FIG. 14, with like numbers referring to like elements. In this embodiment, the pin 66 does not have a cam 66*c*, but rather there is a bushing 118 which is mounted to the main body 66*a*. The bushing 118 may be one of several bushings having different diameters, and the bushing having the desired diameter is chosen to configure each of the springs 62,64 as desired.

All of the embodiments described above use both the opening spring 62 and the closing spring 64, with the excentric pin 66 used to adjust the ends 62*a*,64*a* of the opening spring 62 and closing spring 64. However, it is within the scope of the invention the the excentric pin 66 may be used with a single spring design, where two pins 66 are used to correctly position each end of the single spring.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
    a throttle control assembly, including:
        a housing defining a central port;
        a valve plate disposed in the central port and mounted on a shaft;
        an actuator for controlling the rotation of the valve plate and the shaft;
        at least one gear, the rotation of the at least one gear controlled by the actuator, the rotation of the at least one gear controls the rotation of the shaft;
        an opening spring having a first end;
        a closing spring having a first end separated from and abutting the first end of the opening spring; the opening and closing springs being operable for biasing the at least one gear, such that the valve plate is placed in a default flow position; and
        at least one adjustment pin attached to the housing such that the at least one adjustment pin contacts only the first end of the opening spring;
        wherein the adjustment pin is constructed and arranged to be movable to change a position of the first end of the opening spring causing a position of the abutting first end of the closing spring to change relative to the housing to adjust the default flow position of the valve plate.

2. The apparatus of claim 1, the at least one adjustment pin further comprising:
    a main body;
    a cam integrally formed with the main body;
    wherein the at least one adjustment pin is rotated to adjust the position of the cam relative to the at least one spring.

3. The apparatus of claim 1, the at least one adjustment pin further comprising:
    a knurled portion adjacent the cam; and
    a press-zone portion adjacent the knurled portion;
    wherein the at least one adjustment pin is inserted into a mounting aperture of the housing such that the press-zone portion is disposed in the aperture, the at least one adjustment pin is then rotated to adjust the default flow position of the valve plate, and the at least one adjustment pin is then further pressed into the aperture to fixedly mounted the at least one adjustment pin to the housing.

4. The apparatus of claim 1, the at least one adjustment pin further comprising a ribbed portion, wherein the ribbed portion is inserted into a mounting aperture formed as part of the housing to fixedly mount the at least one adjustment pin to the housing.

5. The apparatus of claim 1, further comprising:
    a drive portion integrally formed with the main body;
    wherein the drive portion is rotated to rotate the at least one adjustment pin and place the at least one adjustment pin is the desired position.

6. The apparatus of claim 5, the drive portion further comprising an external drive portion having a plurality of external splines.

7. The apparatus of claim 5, the drive portion further comprising an internal drive portion having a plurality of internal splines.

8. The apparatus of claim 1, further comprising a bushing mounted to the pin, wherein an outer diameter of the bushing contacts the at least one spring.

9. The apparatus of claim 1, further comprising:
    a second adjustment pin fixedly mounted to the housing adjacent the at least one gear; and
    a gear stop integrally formed as part of the at least one gear;
    wherein the second adjustment pin is positioned to adjust the position of the at least one gear and the position of the valve plate.

10. A throttle control assembly, comprising:
    a housing;
    a central port formed as part of the housing;
    a valve plate mounted on a shaft such that the valve plate is disposed in the central port;
    a gear assembly;
    a sector gear being part of the gear assembly, the sector gear mounted on the shaft;
    an actuator engaged with the gear assembly,
    an opening spring having a first end, the opening spring being operable for biasing the sector gear towards an open position;
    a closing spring having a first end separated from and abutting the first end of the opening spring, the opening spring being operable for biasing the sector gear towards a closed position; and
    at least one adjustment pin operable for adjusting the position of the opening spring and the closing spring, the adjustment pin contacting only the first end of the opening spring;
    wherein the adjustment pin is constructed and arranged to be movable relative to the housing to adjust the position of the opening spring causing a position of the abutting the closing spring to change, which changes the position of the sector gear, the shaft, and the valve plate.

11. The throttle control assembly of claim 10, the at least one adjustment pin further comprising:
    a main body; and
    a cam integrally formed with the main body;

wherein the at least one adjustment pin is rotated such that the cam changes the position of the opening spring and the closing spring.

12. The throttle control assembly of claim 11, the at least one adjustment pin further comprising a drive portion, wherein the drive portion is used to rotate the at least one adjustment pin.

13. The throttle control assembly of claim 11, the drive portion further comprising an external drive portion having a plurality of external splines.

14. The throttle control assembly of claim 11, the drive portion further comprising an internal drive portion having a plurality of internal splines.

15. The throttle control assembly of claim 10, the at least one adjustment pin further comprising:
   a knurled portion integrally formed with the main body adjacent the cam; and
   a press-zone portion adjacent the knurled portion;
   wherein the at least one adjustment pin is inserted into a mounting aperture of the housing such that the press-zone portion is disposed in the aperture, the at least one adjustment pin is then rotated to adjust the default flow position of the valve plate, and the at least one adjustment pin is then further pressed into the aperture to fixedly mounted the at least one adjustment pin to the housing.

16. The throttle control assembly of claim 10, the at least one adjustment pin further comprising a ribbed portion formed as part of the main body adjacent the cam, wherein the ribbed portion is inserted into a mounting aperture formed as part of the housing to fixedly mount the at least one adjustment pin to the housing.

17. The throttle control assembly of claim 10, further comprising:
   a second adjustment pin fixedly mounted to the housing adjacent the sector gear; and
   a gear stop integrally formed as part of the sector gear;
   wherein the second adjustment pin is positioned to adjust the position of the sector gear and the position of the valve plate.

18. The throttle control assembly of claim 10, further comprising a bushing mounted to the pin, wherein an outer diameter of the bushing contacts the at least one spring.

19. A throttle control assembly, comprising:
   a housing;
   a central port formed as part of the housing;
   a valve plate mounted on a shaft such that the valve plate is disposed in the central port;
   a gear assembly;
   a sector gear being part of the gear assembly, the sector gear mounted on the shaft;
   an actuator engaged with the gear assembly,
   a mounting aperture integrally formed as part of the housing;
   at least one adjustment pin disposed in the mounting aperture;
   an opening spring having a first end in contact with the at least one adjustment pin, and a second end engaged with the sector gear;
   a closing spring having a first end separated from and abutting the first end of the opening spring, and a second end engaged with the housing;
   a main body being part of the at least one adjustment pin;
   a cam integrally formed with the main body, the cam being in contact with only the first end of the opening spring; and
   a drive portion integrally formed with the main body adjacent the cam, the drive portion being part of the at least one adjustment pin;
   wherein, when the drive portion of the at least one adjustment pin is rotated, the cam changes the position of the first end of the opening spring causing a position of the abutting first end of the closing spring to change, to adjust the position of the sector gear and the valve plate.

20. The throttle control assembly of claim 19, the at least one adjustment pin further comprising:
   a knurled portion formed as part of the main body adjacent the cam; and
   a press-zone portion integrally formed as part of the main body adjacent the knurled portion;
   wherein the press-zone portion is pressed into the mounting aperture, and after the at least one adjustment pin is rotated to change the position of the first end of the opening spring and the first end of the closing spring, the at least one adjustment pin is further pressed into the mounting aperture such that the knurled portion is pressed into the mounting aperture, fixedly mounting the at least one adjustment pin in the mounting aperture.

21. The throttle control assembly of claim 19, further comprising a ribbed portion formed as part of the main body adjacent the cam, wherein the ribbed portion is inserted into the mounting aperture formed as part of the housing to fixedly mount the at least one adjustment pin to the housing.

22. The throttle control assembly of claim 19, the drive portion further comprising an external drive portion having a plurality of external splines.

23. The throttle control assembly of claim 19, the drive portion further comprising an internal drive portion having a plurality of internal splines.

24. The throttle control assembly of claim 19, further comprising:
   a second adjustment pin fixedly mounted to the housing adjacent the sector gear; and
   a gear stop integrally formed as part of the sector gear;
   wherein the second adjustment pin is positioned to adjust the position of the sector gear and the position of the valve plate.

* * * * *